June 2, 1970  E. J. JENDRY  3,515,400
WEAR COMPENSATED LATHE CHUCK
Filed Aug. 25, 1966  2 Sheets-Sheet 1
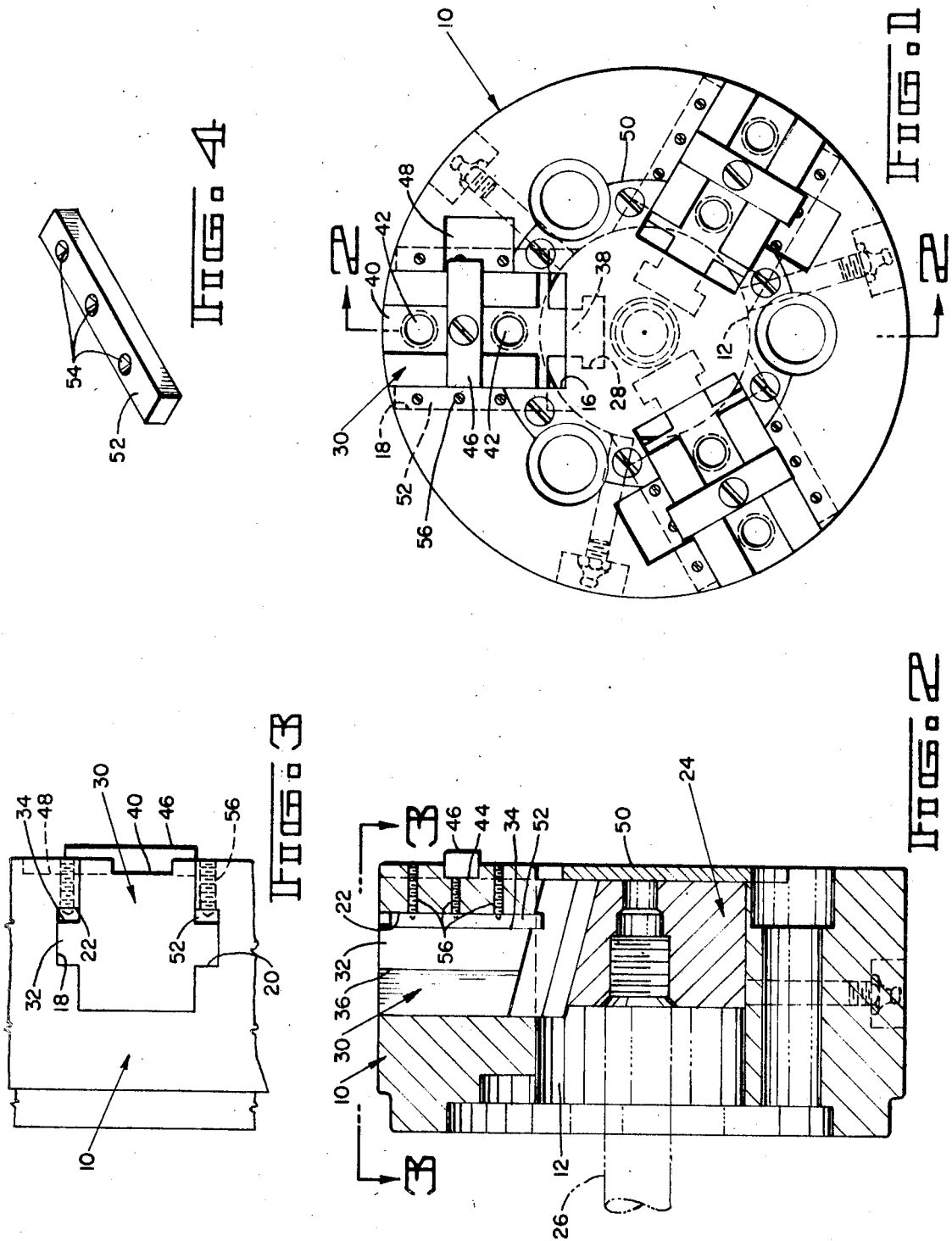
INVENTOR.
EDWARD J. JENDRY
BY
ATTORNEYS.

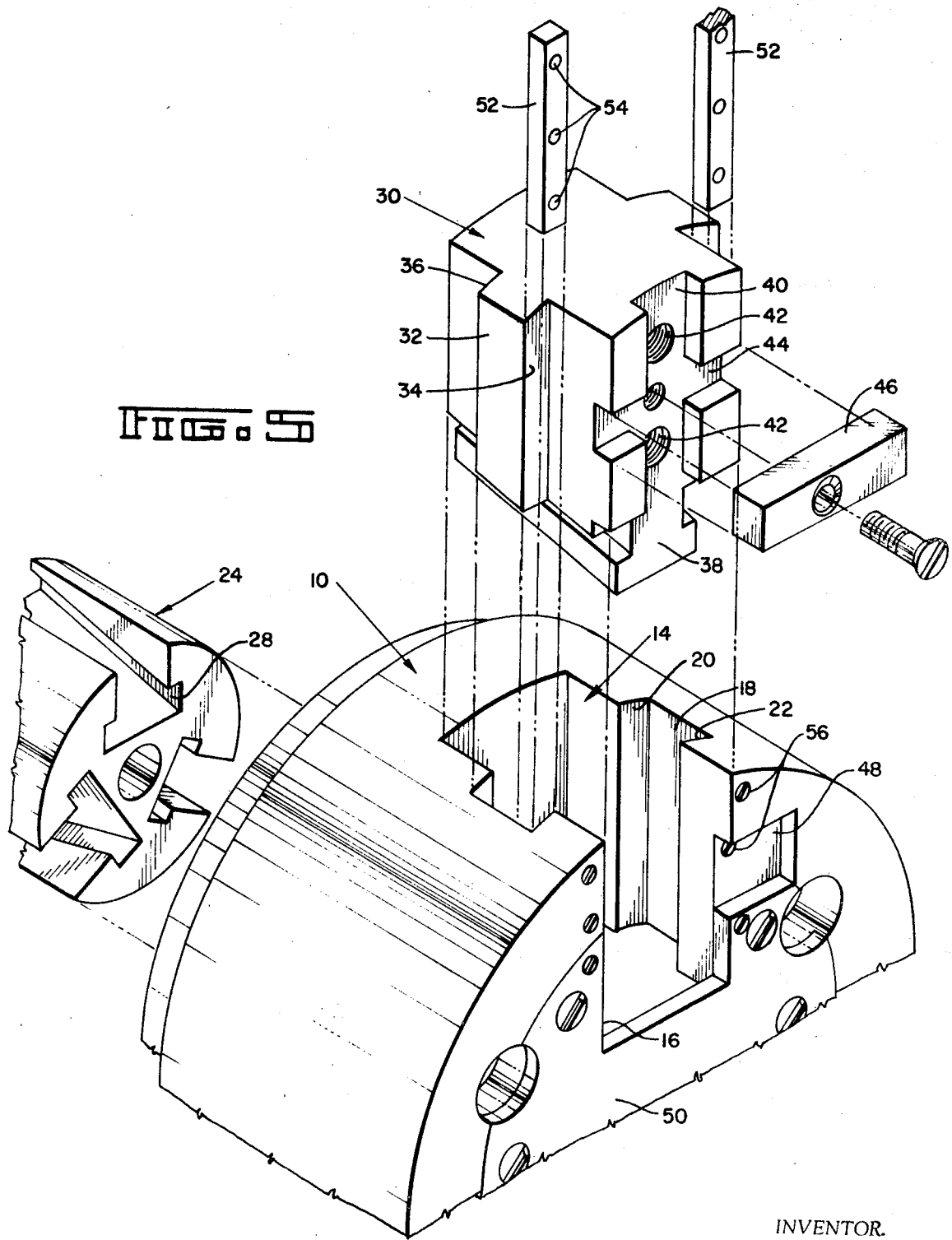

United States Patent Office 3,515,400
Patented June 2, 1970

3,515,400
WEAR COMPENSATED LATHE CHUCK
Edward J. Jendry, Newington, Conn.
(Quiet Entry Farm, Keene, Va. 22946)
Filed Aug. 25, 1966, Ser. No. 575,029
Int. Cl. B23b 31/16
U.S. Cl. 279—121                            2 Claims This invention relates in general to chucks and more particularly to chucks of the type having movable wedge-operated jaw units for holding tools or work pieces which are to be machined. More particularly, the present invention is directed to providing compensation for wear on the ways and jaws of a wedge-type chuck. Accordingly, the general objects of the present invention are to provide novel methods and apparatus of such character.

In the conventional or standard wedge-type chuck, opening and closing of the chuck jaws is accomplished by imparting radial movement to the jaw carriers. The chuck body is provided with keyways or grooves, often referred to in the art as jaw body locks, and the jaw carriers are provided with oppositely extending flanges, commonly known as jaw locks, which slide back and forth in the keyways as the jaws are opened and closed. The sliding contact between the keyways and the flanges on the jaw carriers naturally results in wear of these parts. This wear, in turn, results in undesirable canting or wobbling of the chuck jaws.

In the prior art, when the metal-to-metal sliding contact between the chuck jaws and ways in the chuck body resulted in sufficient wear so as to interfer with operation of the chuck, the entire chuck was often discarded and an entire new unit installed on the lathe or other machine. Attempts have been made at repair of worn wedge-type chucks. These attempts have generally comprised regrinding the keyways and machining replacement jaw carriers which would be of such size as to compensate for wear on both the original jaw carrier flanges and the sides of the keyways in the chuck body. As should be obvious, repairing a worn chuck in the above described manner is an expensive, hit or miss proposition which has met with very limited success and which has produced mongrel jaw carriers having utility in but a single chuck.

The present invention overcomes the above discussed disadvantages of prior art wedge-type chucks by providing novel means for compensating for wear of the jaw carriers and chuck body.

It is therefore an object of the present invention to compensate for wear of sliding surfaces of a chuck.

It is another object of the present invention to compensate for wear of sliding surfaces of a wedge-type chuck.

It is yet another object of the present invention to provide a wedge-type chuck having wear compensating means incorporated therein.

These and other objects of the present invention are accomplished by the use of inserts which are positioned between first sides of the keyways in the chuck body and the complementary flanges on the jaw carriers. By adjusting these inserts, compensation is provided for any wear on the jaw carriers and chuck body.

This invention may be better understood and its various advantages will become apparent to those skilled in the art by reference to the accompanying drawing wherein like reference numerals refer to like lements in the various figures and in which:

FIG. 1 is a front view of a first embodiment of a wedge-operated chuck having wear compensating means in accordance with the teachings of this invention.

FIG. 2 is a cross-sectional side view, taken along line 2—2 of FIG. 1, of the embodiment of the present invention shown in FIG. 1.

FIG. 3 is a partial top view, taken along line 3—3 of FIG. 2, of the embodiment of the present invention shown in FIG. 1.

FIG. 4 is a perspective view of one of the compensating inserts employed in the present invention.

FIG. 4 is a prespective view of one of compensating inserts employed in the past invention.

FIG. 5 is an exploded view of a portion of the embodiment of the present invention shown in FIG. 1.

Referring now to the drawing, and particularly to FIG. 1, the depcited preferred embodiment of the present invention comprises a chuck body indicated generally at 10. Chuck body 10 is usually, although not necessarily, fo generally circular cross section and is comprised of a metallic material such as steel. If weight is important, for example in operation where high speeds or rapid starting and stopping is a requirement, body 10 may be comprised of a lightweight metallic material such as aluminum provided with suitable inserts and plates. Chuck body 10 is cast or machined so as to provide a centrally disposed bore 12 and a plurality of radially outward extendin apertures 14. Chuck body 10 is also provided with guide slots 16 which extend between each of apertures 14 and the front face of the chuck body. Apertures 14 have keyways 18 formed in oppositely disposed sides thereof. The oppositely disposed side surfaces 20 and 22 of keyways 18 are portions of the chuck which, prior to the present invention, would wear thus presenting the need for wear compensation.

An operating head indicated generally at 24 (see FIGS. 2 and 5) is inserted in center bore 12 and is adapted for movement axially of the bore. This axial movement is imparted by a drive rod 26 which is activated by means, not shown. Operating head 24, as may best be seen from FIG. 5, is provided with three coupling grooves 28 which slope upwardly towards the read of the chuck body.

A plurality of jaw carriers, indicated generally at 30, are disposed in apertures 14. The jaw carriers have flanges 32, hereinafter referred to as jaw locks, extendin from opposite sides thereof. Jaw locks 32 are adapted to fit in keyways 18. As will be explained below, jaw carriers 30 move radially inwardly and outwardly in apertures 14. During this radial movement, the sides 34 and 36 of jaw locks 32 slide on adjacent metal surfaces thus causing wear of the sides of jaw locks 32 and, as mentioned above, the sides 20 and 22 of the keyways 18. The jaw carriers 30 are also provided wtih a coupling rib 38 (see FIG. 5) the surfaces of which slope upwardly away from the front of the chuck body. Coupling ribs 38 are engaged by coupling grooves 28 in the operating head 24 and, as the operating head is caused to move axially along center bore 12, the jaw carriers are wedged inwardly and outwardly with relation to the axis of center bore 12. Jaw carriers 30 are also provided with slots 40 in their front surface and, at the base thereof, with threaded holes 42. Transverse to each slot 40 is a second slot 44 into which is bolted a stop member 46. Member 46 limits the motion of the jaw carriers by engaging the sides of a slot 48 defined in part by a face plate 50 which is bolted to the front end of the chuck body 10. The actual chuck jaws have not been shown but would be bolted into slot 40 via threaded holes 42 in each of jaw carriers 30.

The means for compensating for wear of the sides 34 and 36 of jaw locks 32 of jaw carriers 30 and sides 20 and 22 of keyways 18 comprise a plurality of inserts 52. A single insert is shown in FIG. 4 and the function of and relationship of the insects to the other elements of the chuck may best be seen from FIGS. 2, 3 and 5. Insects 52 are preferably comprised of hardened steel and are provided with a plurality of indentations 54 in a first side thereof. Inserts 52 are rectangular in shape and are designed to be positioned between the front side 34 of each of jaw locks 32 and side 22 of its associated keyways 18; there thus being two compensating inserts for each jaw carrier. The chuck body 10 and/or face plate 50 are drilled from the front end (the end from which the jaws protrude through guide slots 16) to provide threaded holes which communicate with keyways 18. A plurality of set screws 56 are inserted in these holes and, as may best be seen from FIGS. 2 and 3, extend into the keyways 18. The ends of set screws 56 engage the indentations 54 in inserts 52. By proper adjustment of set screws 56, the inserts 52 may be urged firmly, but not too tightly, against sides 34 of jaw locks 32. The engagement of indentions 54 by the ends of set screws 56 prevents movement of inserts 52 as the jaw carriers 30 are caused to travel in apertures 14 during opening and closing of the chuck jaws.

In operation, as the chuck jaws are repeatedly opened and closed, jaw locks 32 slide inwardly and outwardly in keywards 18. Even with the best lubrication possible, this metal to metal sliding contact results in gradual erosion of the sides of the jaw locks and the surfaces against which they slide. In the present invention, the surfaces which wear are the sides 34 and 36 of the jaw locks 32, rear surfaces 20 of keyways 18 and, to a much lesser degree, the rear or unindented side of inserts 52. As wear increases and jaw wobble begins to occur, compensation is effected merely by adjusting set screws 56 so as to urge the inserts firmly against the jaw locks. Should uneven wear occur and, for example, one end of a jaw lock exhibit greater wear than the other, the compensation means of the present invention can overcome the effects of such uneven wear through proper independent adjustment of the three set screws provided for each insert. Should appreciate wear of the inserts occur, they may be replaced at minimal cost.

While a preferred embodiment has been shown and described, various modifications and substitutions may be made without departing from the spirit and scope of this invention. Accordingly, it is to be understood that this invention has been described by way of illustration rather than limitation.

What is claimed is:
1. A chuck comprising:
chuck body means having a center bore and a plurality of apertures extending radially outward from said center bore, each of said apertures being of substantially rectangular cross-sectional shape and communicating at one end with an end of said body means, each of said apertures having a pair of oppositely disposed keyways extending laterally of the opposite sides thereof;
a plurality of wedge operated jaw carriers, each of said carriers having a pair of flanges extending from opposite sides thereof, said jaw carriers having a cross-sectional shape commensurate with the shape of said body means radial apertures, said jaw carriers being disposed in respective apertures in said body means with said flanges disposed in said keyways;
operating means disposed in said center bore in said body means, said operating means engaging the inner end of said jaw carriers and imparting radial movement to said carriers;
a hardened steel wear compensating insert disposed between the side of each of said jaw carrier flanges which is located closest to said end of said body means and the adjacent wall of its associated keyway, each of said inserts being of rectangular cross section and having a length and width commensurate with the length and width of said flanges; and
a plurality of set screws associated with each of said wear compensating inserts, said set screws extending through a portion of said body means which defines a side wall of each of said keyways adjacent which said inserts are positioned whereby first ends of a plurality of set screws contact each of said inserts. compensation for uneven waear wear of said chuck body and jaw carrier flanges being permitted by separate adjustment of said set screws.

2. The apparatus of claim 1 wherein said inserts further comprise:
a plurality of indentations on the surface of the hardened steel body which faces the side of the body lock, said indentations being adapted to receive the ends of said set screws.

References Cited
UNITED STATES PATENTS 2,340,450 2/1944 Bouschor _____ 308—3
2,920,896 1/1960 Buck _____ 279—123

FOREIGN PATENTS 587,291 1/1925 France.

ROBERT C. RIORDON, Primary Examiner

U.S. Cl. X.R.

279—123